United States Patent [19]

Yasukawa

[11] Patent Number: 5,164,759

[45] Date of Patent: Nov. 17, 1992

[54] TTL AUTOMATIC FLASH CONTROL CAMERA

[75] Inventor: Seiichi Yasukawa, Kawasaki, Japan

[73] Assignee: Nikon Corporation, Tokyo, Japan

[21] Appl. No.: 723,423

[22] Filed: Jun. 28, 1991

[30] Foreign Application Priority Data

Jul. 4, 1990 [JP] Japan .................................. 2-175298

[51] Int. Cl.$^5$ ............................................ G03B 15/05
[52] U.S. Cl. .................................... 354/415; 354/132; 354/432
[58] Field of Search ................. 354/412, 415, 432, 132

[56] References Cited

U.S. PATENT DOCUMENTS 4,643,551 2/1987 Ohmori ................................. 354/132
4,705,382 11/1987 Mukai et al. ......................... 354/412

FOREIGN PATENT DOCUMENTS 3-68928 3/1991 Japan .

Primary Examiner—Russell E. Adams
Attorney, Agent, or Firm—Shapiro and Shapiro

[57] ABSTRACT

A TTL automatic flash control camera capable of effecting TTL multi-flash control comprises a built-in flash apparatus capable of effecting preliminary flashing, a photoelectric converter for detecting the reflected light distribution information of the area of the object field divided into a plurality of areas by the preliminary flashing of the built-in flash apparatus, a determining device for determining the degree of weighting to the divided areas by the reflected light distribution information, a connecting portion capable of mounting a flash-controllable accessory flash apparatus, and a flash control device for causing the built-in flash apparatus to effect the preliminary flashing, and causing the accessory flash apparatus being mounted to effect main flashing after the photoelectric converter detects the reflected light distribution information, and effecting the control of the quantity of emitted light during the main flashing by the use of the degree of weighting determined by the determining device.

4 Claims, 8 Drawing Sheets

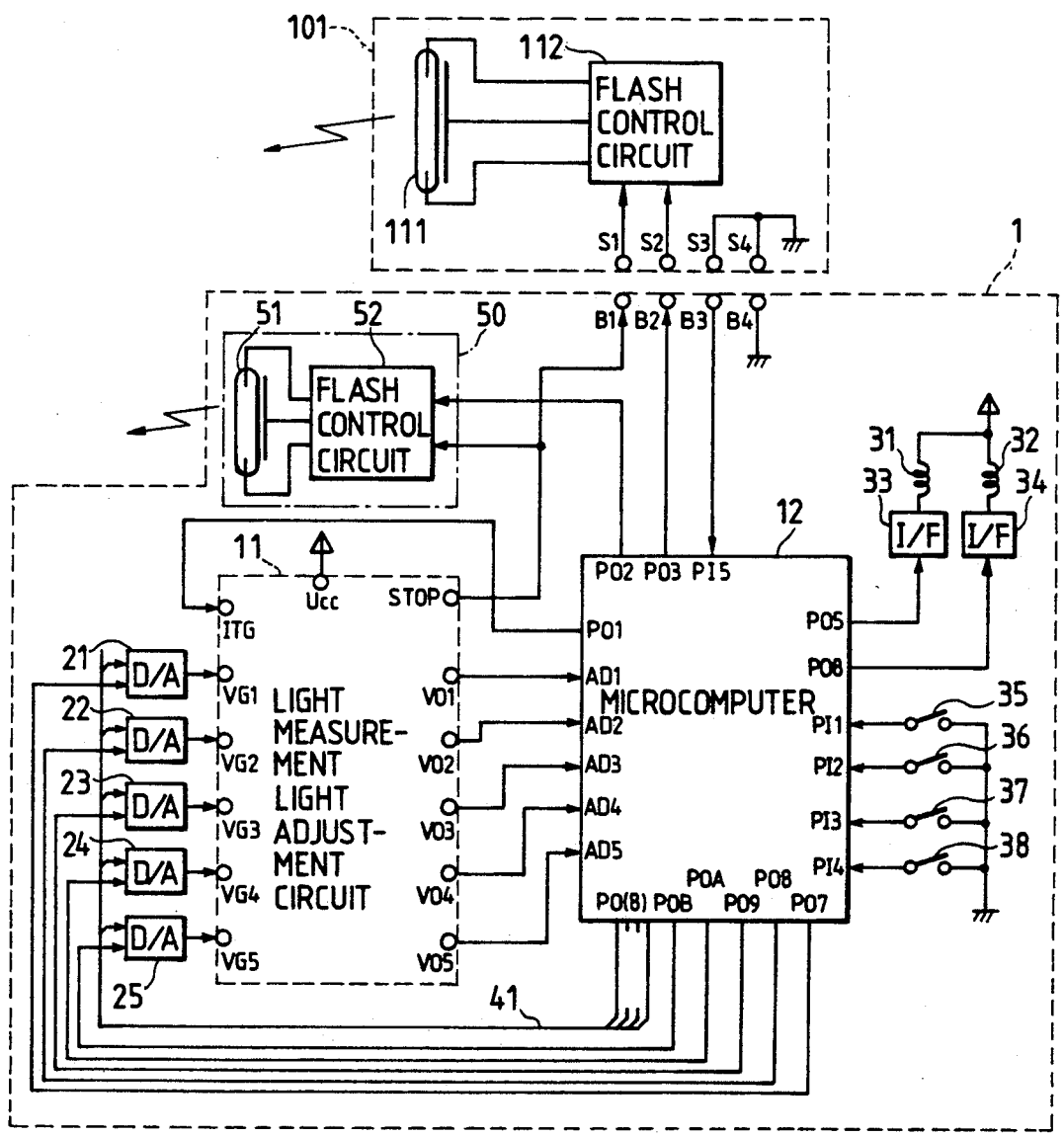

TTL AUTOMATIC FLASH CONTROL CAMERA

BACKGROUND OF THE INVENTION

1. Field of the Invention

This invention relates to a TTL automatic flash control camera capable of effecting TTL multi-flash control.

2. Related Background Art

A camera system capable of effecting TTL automatic flash control has heretofore been such that in a camera body, a light receiving element is disposed at a location facing the whole or main portion of the surface of film and after a shutter interposed between the surface of the film and the light receiving element is fully opened, a flash apparatus is caused to start flashing and light created by the image of the object field being reflected by the surface of the film is photoelectrically converted by the light receiving element and a signal corresponding to the integrated amount of the quantity of light is compared with a predetermined value, whereby the quantity of emitted light of the flash apparatus is controlled so that predetermined brightness may be provided on the surface of the film. The disadvantage of this system is that the detection area of the object field is monistic and therefore various situations of the object field cannot be coped with and the exposure of the main object the photographer desires to photograph does not become proper. Some techniques for solving this problem have been developed in recent years.

As one of them, U.S. application Ser. No. 560,745 (filed on Jul. 31, 1990) based on Japanese Patent Application No. 1-203735 proposes, the following automatic flash control, the following system adopting the concept of multi-pattern photometry. A plurality of photoelectric converters capable of dividing the object field into a plurality of areas and metering these areas are disposed at locations facing the surface of film and immediately before a focal plane shutter interposed between the surface of the film and the plurality of photoelectric converters, a flash apparatus is caused to effect preliminary flashing and light created by the object image by the flashlight being reflected by the surface of a shutter curtain is caught by the plurality of photoelectric converters and the outputs thereof severally integrated are detected as the object field reflected light distributions of the respective areas by the flashing. The detected object field reflected light distribution information of each area is calculation-processed by predetermined multi-pattern algorithm, thereby determining such a degree of weighting to each of the divided areas that optimum exposure is provided to the main object. Subsequently, immediately after the shutter is opened, the flash apparatus is caused to effect main flashing, and light reflected by the surface of the film is caught a plurality of same photoelectric converters as said photoelectric converters, and the weighting whose degree has been determined is effected on the outputs thereof, and then the outputs are summed and integrated, and the flashing of the flash apparatus is stopped at timing determined by the integrated value being compared with a predetermined value, thus terminating the flash control of the main flashing. That is, the quantity of emitted light is determined at timing for stopping the flashing of the flash apparatus. The TTL flash control system of this camera system, i.e., a TTL flash control system involving preliminary flashing, will hereinafter be referred to as the "TTL multi-flash control". In contrast, a TTL flash control system which does not involve preliminary flashing will hereinafter be referred to as the "TLL ordinary flash control".

When it is desired that the technique of TTL multi-flash control disclosed in this Japanese Patent Application No. 1-203735 be evolved in the actual camera system, both of the camera body and the flash apparatus be endowed with predetermined new functions. That is, it is necessary that the camera body have a photoelectric converter capable of effecting split photometry, an output signal processing circuit, a sequence controller, etc. and that the flash apparatus have a device for repetitively effecting preliminary flashing and main flashing within a short time and controlling the quantity of emitted light so as to limit the maximum quantity of emitted light in preliminary flashing in order not to reduce the ability of main flashing very much.

However, the camera body and the flash apparatus which are endowed with the new functions are in relality also connectable to those of the conventional type and in such a combination, photographing can be accomplished only under the TTL ordinary flash control of the conventional type. Particularly, when flash photographing is to be effected with a flash apparatus of the conventional type which is capable of TTL ordinary flash control mounted on a camera body having the TTL multi-flash control function, the impression of a useless possession is undeniable.

Also, when TTL multi-flash control photographing is possible, loss of some energy is unavoidable even if a contrivance is made to limit the quantity of emitted light during preliminary flashing as described above, and there is a demerit that the guide number during actual photographing is reduced.

SUMMARY OF THE INVENTION

The present invention has been proposed to solve such a problem.

According to a first embodiment of the present invention, in a TTL automatic flash control camera capable of effecting TTL multi-flash control, a first flash apparatus (a built-in flash apparatus) is contained in the camera body and a second flash apparatus (an accessory flash apparatus) is mountable on a connecting portion such as an accessory shoe, and the first flash apparatus is caused to effect preliminary flashing to thereby detect reflected light distribution information, whereafter the second flash apparatus in its mounted state is caused to effect main flashing.

According to a second embodiment of the present invention, in a TTL automatic flash control camera capable of effecting TTL multi-flash control, a first flash apparatus (a built-in flash apparatus) is contained in the camera body and a second flash apparatus (an accessory flash apparatus) is mountable on a connecting portion such as an accessory shoe, and the presence or absence of the second flash apparatus mounted is detected, and the first flash apparatus is caused to effect preliminary flashing to thereby detect reflected light distribution information, whereafter if the presence of the second flash apparatus mounted is detected, the second flash apparatus is caused to effect main flashing, and if the absence of the second flash apparatus mounted is detected, the first flash apparatus is caused to effect main flashing.

Thus, according to the present invention, in the TTL automatic flash control camera of the first embodiment, if the accessory flash apparatus of the conventional type capable of TTL ordinary flash control is mounted on the camera body, main flashing is effected by the accessory flash apparatus in subsequence to the preliminary flashing by the built-in flash apparatus and flash photographing under TTL multi-flash control becomes possible.

Also, in the TTL automatic flash control camera of the second embodiment, when the accessory flash apparatus is not mounted on the camera body, that is, even when the accessory flash apparatus is not mounted depending on scene, preliminary flashing and main flashing are effected on end by only the built-in flash apparatus, whereby flash photographing under TTL multi-flash control becomes possible.

BRIEF DESCRIPTION OF THE DRAWINGS

FIG. 4 is a block circuit diagram showing a situation in which an embodiment of the TTL automatic flash control camera according to the present invention is combined with an accessory flash apparatus.

DETAILED DESCRIPTION OF THE PREFERRED EMBODIMENTS

A TTL automatic flash control camera according to the present invention will hereinafter be described in detail.

Figure 1:
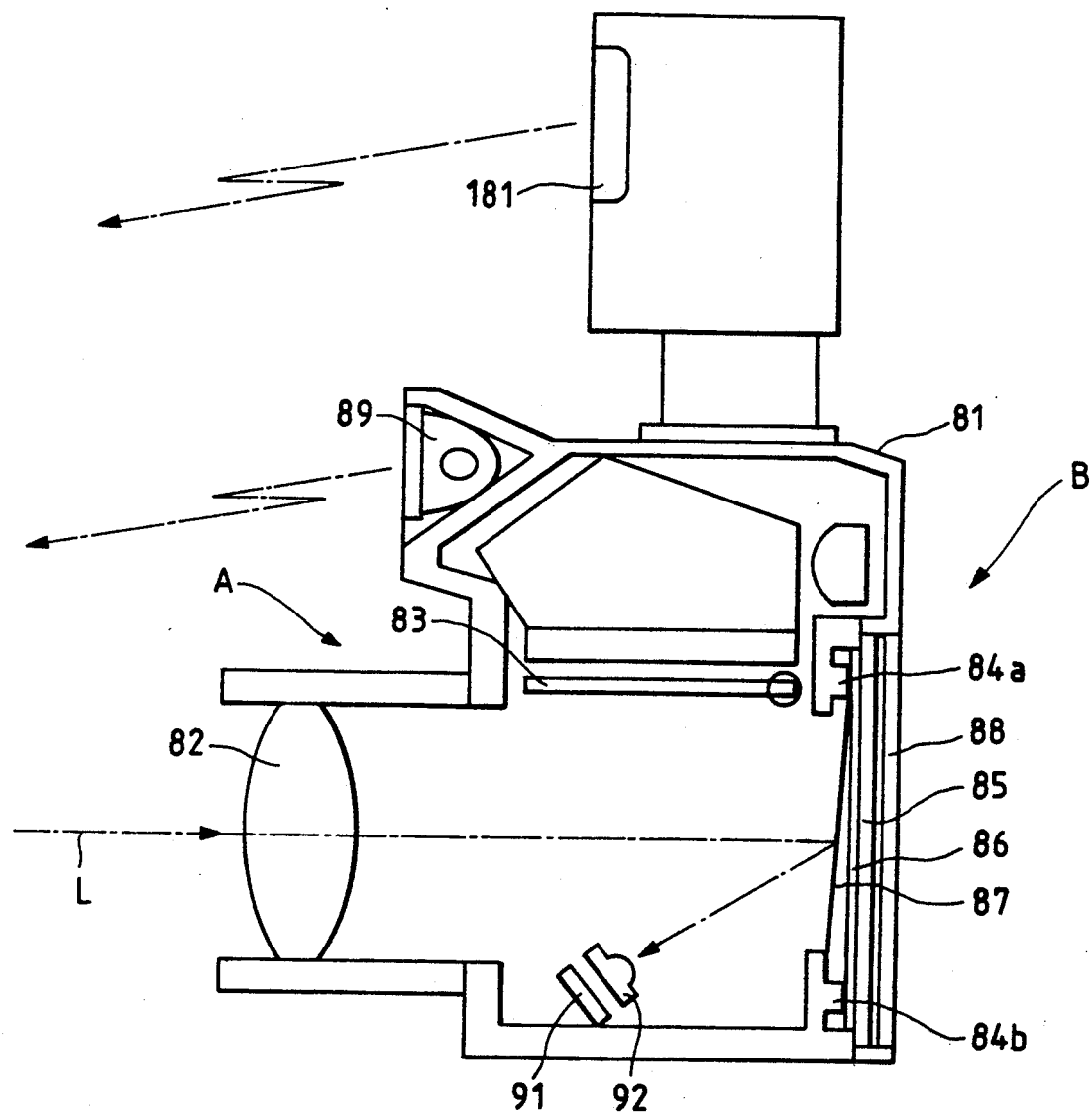
FIG. 1 is a cross-sectional view showing the optical arrangement of a photoelectric converter in a TTL automatic flash control camera system according to the present invention.

FIG. 1 is a cross-sectional view for showing the optical arrangement of a photoelectric converter in an embodiment of the present invention, and shows a state in which a flash apparatus (accessory flash apparatus) 181 is mounted on a camera body 81. In the camera body 81, inner rails 84a, 84b and a pressure plate 85 fix film 86 at a position whereat a light beam passed through a phototaking lens 82 in the state of FIG. 1 wherein a movable mirror 83 is retracted is imaged. The leading curtain 87 of a focal plane shutter lies immediately in front of the film 86 and intercepts light in order not to permit the exposure of the film 86 during the other times than the time of photographing. During exposure, i.e., when the leading curtain 87 of the shutter is in its retracted state, the light beam L from an object is refracted by the photo-taking lens 82 and imaged on the surface of the film 86, and part of it is reflected and arrives at a condensing lens 92 and a photoelectric converter 91. During the other time than exposure, i.e., when the leading curtain 87 of the shutter is at the position of FIG. 1, the light beam L from the object is refracted by the photo-taking lens 82 and substantially imaged on the surface of the leading curtain 87 of the shutter, and part of it is reflected and also arrives at the condensing lens 92 and the photoelectric converter 91. The reference numeral 89 designates a flash apparatus (built-in flash apparatus) contained in the camera body 81, and the reference numeral 90 denotes the trailing curtain of the focal plane shutter.

Figure 2:
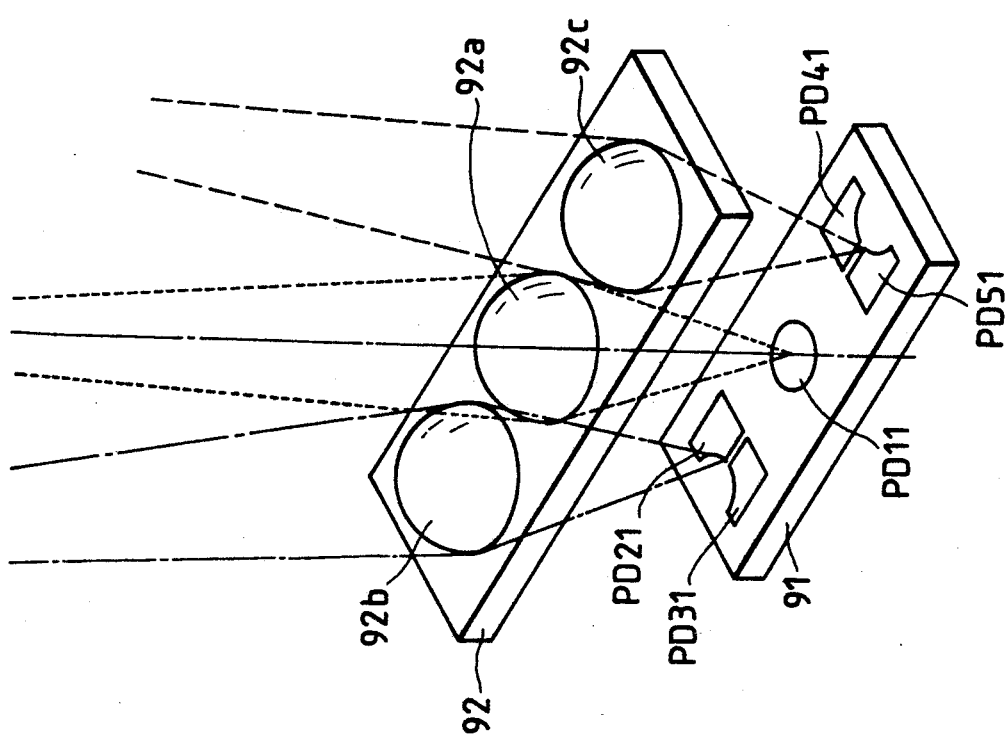
FIG. 2 is a perspective view showing the structure of the photoelectric converter and a condensing lens.

FIG. 2 shows the structure of the photoelectric converter 91 and the condensing lens 92. The photoelectric converter 91 is such that a circular light receiving area PD11 and on the opposite sides thereof, light receiving areas PD21, PD31 and PD41, PD51 of a rectangular shape cut away by an arc are disposed on the same plane. The condensing lens 92 is an optical member having three lens portions 92a, 92b and 92c corresponding to the three blocks of the light receiving areas.

Figure 3:
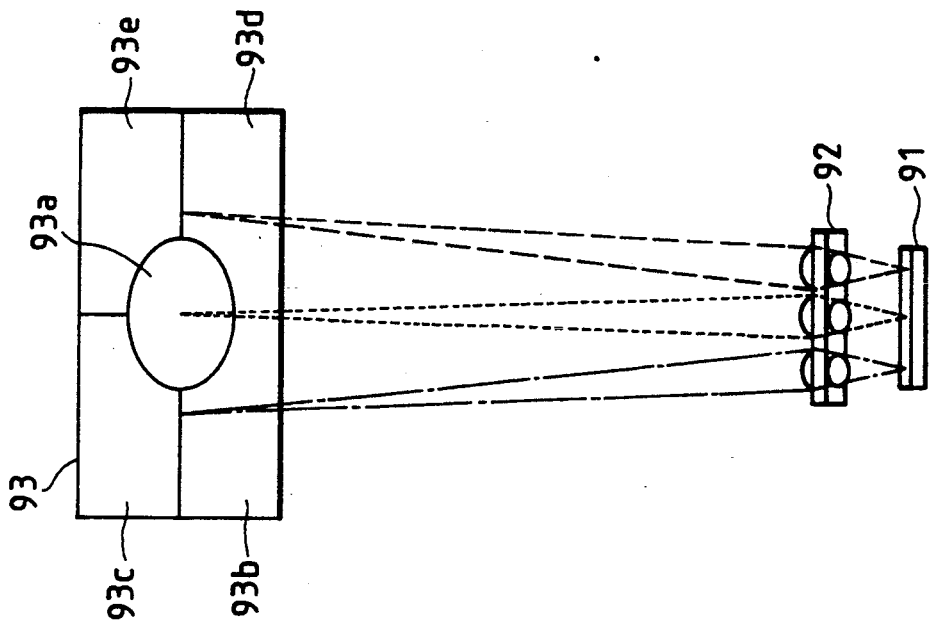
FIG. 3 shows the optical positional relation among the opening area of the surface of film, the photoelectric converter and the condensing lens as it is seen in the direction of arrow A in FIG. 1.

FIG. 3 shows the optical positional relation among the opening area 93 of the surface of the film, the photoelectric converter 91 and the condensing lens 92 as it is seen in the direction of arrow A in FIG. 1. Assuming that the opening area 93 of the surface of the film is divided into five areas, i.e., a central circular portion 93a and four marginal rectangular portions 93b, 93c, 93d and 93e, the three central, left and right blocks comprising the five light receiving areas of the photoelectric converter shown in FIG. 2 face the central portion, the left half and the right half, respectively, of the opening portion of the surface of the film via the three lens portions of the condensing lens, as indicated by a fine broken line, a dot-and-dash line and a rough broken line, respectively, and cause them to be substantially imaged. Further, the five light receiving areas PD11, PD21, PD31, PD41 and PD51 of the photoelectric converter 91 of FIG. 2 are made coincident in shape with the areas 93a, 93b, 93c, 93d and 93e of the opening portion of the surface of the film shown in FIG. 3 and therefore, the photoelectric converter 91 is a photoelectric converter which divisionally meters the brightnesses of the five areas.

FIG. 4 is a block circuit diagram showing a situation in which an embodiment of the TTL automatic flash control camera according to the present invention is combined with an accessory flash apparatus.

This TTL automatic flash control camera system comprises a camera body 1 and a flash apparatus (accessory flash apparatus) 101 which are electrically connectable together through four contacts B1-B4 and S1-S4, and among these contacts, the contacts B4 and S4 are GND connection terminals.

The flash apparatus 101 comprises a flashing portion 111 and a flash control circuit 112, which has a booster circuit, a main capacitor, a flashing control SCR, etc. and controls the starting and stoppage of flashing of the flashing portion 111 in response to a flashing start signal from the contact S2 and a flashing stop signal from the contact S1. The contact S3 is normally connected to the GND connection terminal S4, and an L-level signal produced at this contact S3 provides a signal for informing the camera body 1 of the connection of the accessory flash apparatus 101.

The camera body 1 is comprised of a light measurement and light adjustment circuit 11 and a microcomputer 12 as main elements.

Figure 5:
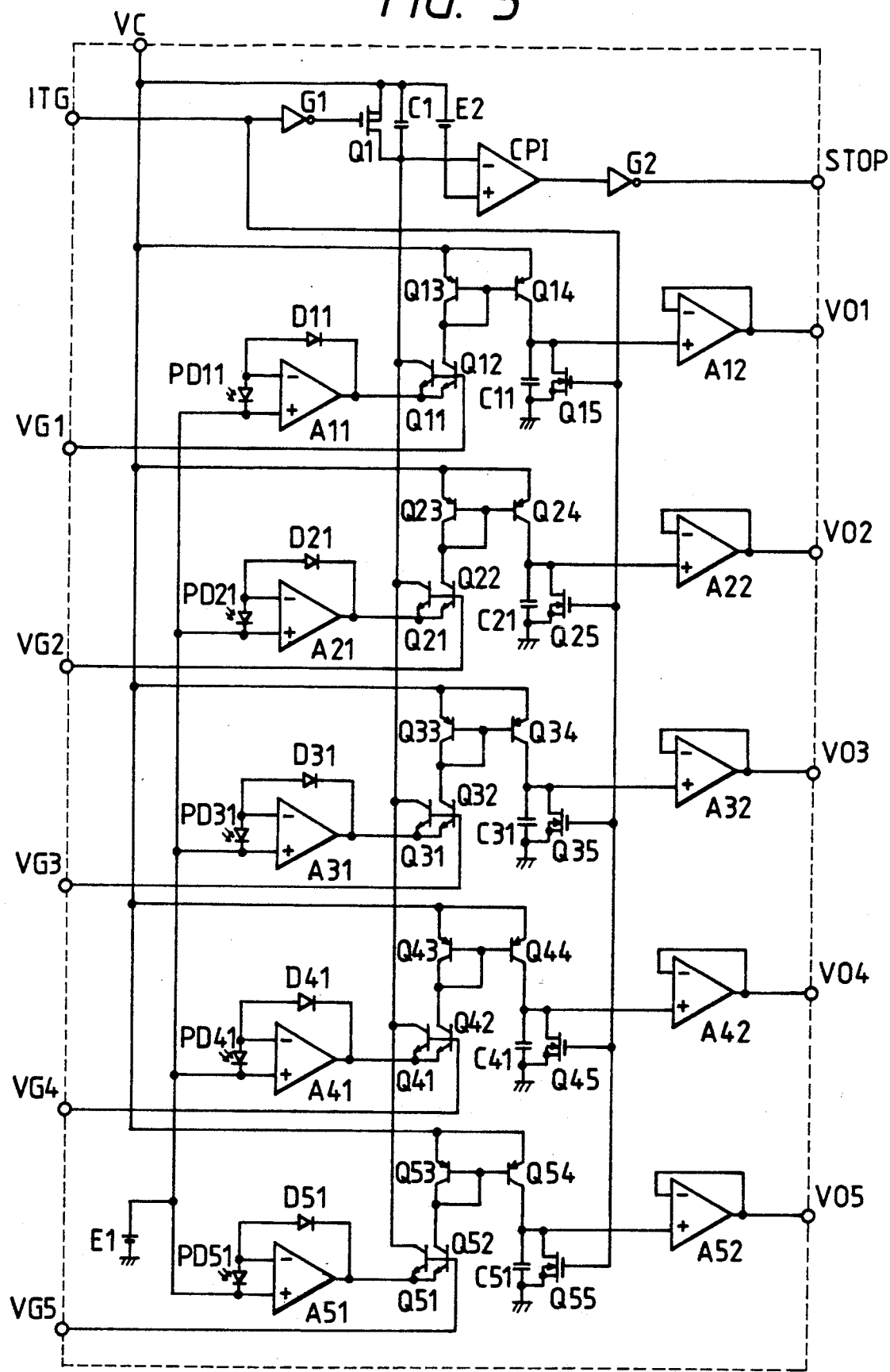
FIG. 5 shows the interior of the light measurement and light adjustment circuit shown in FIG. 4.

The internal circuit of the light measurement and light adjustment circuit 11 will first be described with reference to FIG. 5. PD11-PD51 designate photodiodes as the photoelectric converter shown in FIG. 2 which is divided into five areas. These photodiodes output photocurrents proportional to illumination. The photocurrent output by the photodiode PD11 is converted into a voltage output logarithmically compressed by an operational amplifier A11 subjected to the feedback of the photodiode PD11. This output voltage is based on a reference voltage source E1 as a reference. Transistors Q11 and Q12 use this voltage as the potential of their emitters and the input voltage from a gain setting input terminal VG1 as the potential of their bases, and output collector currents logarithmically expanded by a gain determined by the difference between these potentials. The collector current of the transistor Q12 is inverted by the current mirror circuit of transistors Q13 and Q14 and charges a capacitor C11. The voltage stored in the capacitor C11 is output to an integrated voltage output terminal VO1 through a follower amplifier A12. FETQ15 receives the signal of an integration control signal input terminal ITG and discharges all the charges stored in the capacitor C11. These operations also hold true of the other four light measurement circuits whose outputs are terminals VO2–VO5. On the other hand, the collector currents of five transistors Q11–Q51 are summed and charge a capacitor C1. The voltage stored in this capacitor C1 is compared with a reference voltage E2 by a comparator CP1, and when the relation therebetween is reversed, the output of the comparator CP1 is inverted from L to H, and an output terminal STOP changes from H to L. FETQ1 receives a signal from the integration control signal input terminal ITG and discharges all the charges stored in the capacitor C1.

The microcomputer 12 will now be described. The microcomputer 12 causes D/A converters 21–25 to set independent voltages by selection signals output from the five terminals of output ports P07–P0B while outputting data from an 8-bit output port P0(8) to the D/A converters 21–25 through a data bus 41. The output voltages of the D/A converters 21–25 are input to the gain setting input terminals VG1–VG5, respectively, of the light measurement and light adjustment circuit 11. The fine integrated voltage output terminals VO1–VO5 of the light measurement and light adjustment circuit 11 are connected to the A/D conversion input terminals AD1–AD5, respectively, of the microcomputer 12. The output port P01 is connected to the integration control signal input terminal ITG. The reference numerals 35 and 36 designate mechanical switches movable on the driving sequence of the camera. The switch 35 is a mirror up switch adapted to be clsoed at a point of time whereat mirror up is completed, and the switch 36 is a synchro switch adapted to be closed at a point of time whereat the shutter is fully opened. The reference numerals 37 and 38 denote switches operatively associated with an operating member operated by the photographer. The switch 37 is a release starting switch adapted to be closed when a shutter release button is depressed, and the switch 38 is a flash control mode changeover switch for changing over the TTL flash control method into a TTL multi-flash control directing mode for directing TTL multi-flash control and a TTL ordinary flash control directing mode for directing TTL ordinary flash control. The signals of the above-described four switches are connected to the input ports P11–P14, respectively, of the microcomputer 12 having pull-up resistors. The reference numerals 31 and 32 designate magnets for holding the restraint of a leading curtain 87 and a trailing curtain 89. Signals from the output ports P05 and P06 of the microcomputer 12 are given to these magnets, respectively, through interfaces 33 and 34, whereby the driving of the magnets is controlled. The reference numeral 51 denotes the flashing portion of a flash apparatus (built-in flash apparatus) 50 contained in the camera body 1, and the reference numeral 52 designates a flashing control circuit. The flashing control circuit 52 has a booster circuit, a main capacitor, a flashing control SCR, etc., and controls the starting and stoppage of the flashing of the flashing portion 51 in response to a flashing start signal from the output port P02 of the microcomputer 12 and a flashing stop signal from the STOP terminal of the light measurement and light adjustment circuit 11. The STOP terminal of the light measurement and light adjustment circuit 11 is connected to the flashing control circuit 52 of the built-in flash apparatus 50 and is also connected to the flashing control circuit 112 of the accessory flash apparatus 101 through a contact B1. Through a contact B2, the flashing start signal to the accessory flash apparatus 101 is output from the output port P03 of the microcomputer 12. A contact B3 is a contact for detecting whether the accessory flash apparatus 101 is connected, and this contact is connected to the input port P15 of the microcomputer 12.

The operation of the TTL automatic flash control camera system constructed as described above will now be described with reference to a timing chart shown in FIG. 6 and a flow chart shown in FIG. 7.

When a power source switch is first closed, the microcomputer 12 of the camera body 1 starts to execute the program. Thereby, at #1 shown in FIG. 7, the microcomputer 12 discriminates the state of the switch 37, i.e., the release starting switch, and if the switch 37 is OFF, the microcomputer repeats this and continues to wait for the switch 37 to become ON, and when it is detected that the switch 37 is ON, advance is made to #2 and so on, and the release operation is performed. In FIG. 6, the release starting switch 37 is closed at a point a shown in FIG. 6(a), and this is detected at #1 of the flow chart, and the release operation is started at a point b.

At #2, the magnets 31 and 32 of the leading curtain and the trailing curtain, respectively, are electrically energized, and at #3, a driver, not shown, is driven to start mirror up (a point b shown in FIG. 6(b)). At #4, the microcomputer continues to wait for the switch 35, i.e., the mirror up switch 35 informing of the completion of mirror up, to become ON, and when this switch becomes ON (a point c shown in FIG. 6(c)), the state of the switch 38 is discriminated at #5, and if this switch is ON, that is, if the control method of TTL flash control set by the camera body 1 is the TTL multi-flash control directing mode, advance is made to #6 and so on, and the object field information detecting operation by preliminary flashing is started. That is, at #6, D/A conversion is executed to give the same predetermined voltages to all of the five gain setting voltage input terminals VG1–VG5 of the light measurement and light adjustment circuit 11 (a point d shown in FIGS. 6(h)–(l)). Then, advance is made to #7, where for the light measurement and light adjustment circuit 11, ITG as an integration start signal is rendered into L, and for the flashing control circuit 52 of the built-in flash apparatus 50, the output port P02 is rendered into L (a point e shown in FIGS. 6(m) and (n)). Thus, the built-in flash apparatus 50 starts preliminary flashing, and the quantity of emitted light falls as indicated by the flashing waveform of a point e to a point f shown in FIG. 6(o).

The photodiodes PD11–PD51 of the light measurement and lgiht adjustment circuit 11 catch the reflected light from the object field and output photocurrents proportional to the magnitude thereof. The circuit operation thereafter will now be described with respect to a first channel related to the photodiode PD11. The photocurrent produced in the photodiode PD11 is converted into a voltage output logarithmically compressed by the operational amplifier A11 and the feedback diode D11, and is again converted into a current output logarithmically expanded by the transistors Q11 and Q12 whose emitters are at the potential of said logarithmically compressed voltage output and whose bases are at the potential of the gain setting voltage input VG1, and after all, the collector currents of the transistors Q11 and Q12 are amplified by a gain determined by the potential of VG1 while keeping a proportional relation with the photocurrent, and exhibit an output current waveform similar to the flashing waveform shown in FIG. 6(o). The collector current of the transistor Q12 is converted into a source current of the same value by the current mirror circuit comprising transistors Q13 and Q14, and this current charges the capacitor C11 liberated from its short-circuited condition by the falling of the ITG signal. The charging voltage of the capacitor C11 is converted into a voltage output of low impedance by a buffer amplifier A12 and is put out from the output terminal VO1. This output voltage rises as indicated by the waveform of VO1 from a point e to a point f shown in FIG. 6(t). This is the photocurrent amplified by a predetermined gain and then integrated, and represents it in the form of a voltage of GND standard. With regard to second and subsequent channels, the quantity of reflected light from the object field only varies independently and the circuit operation itself is similar to what has been described above. Since the same voltages are given in advance to VG1-VG5 and the gain is made constant, the transistors Q11-Q51 put out electric currents resulting from the photocurrent being amplified by the same gain. These are parallel-connected and therefore, an electric current resulting from the sum total of the photocurrents of the channels being amplified is stored in the capacitor C1. The terminal voltage of this capacitor C1 varies as indicated by the waveform of the C1 integrated voltage shown in FIG. 6(r), and when this voltage becomes lower than the reference voltage E2, the comparator CP1 inverts the output and the terminal STOP changes from H to L, and this signal is transmitted to the flashing control circuit 52 of the built-in flash apparatus 50 (a point f shown in FIG. 6(s)). Thereby, the built-in flash apparatus 50 stops flashing. Accordingly, the photocurrents produced by the photodiodes PD11-PD51 also become null, and the charging to the integrating capacitors C11-C51 is stopped and the voltages of the output terminals VO1-VO5 are fixed.

Figure 6:
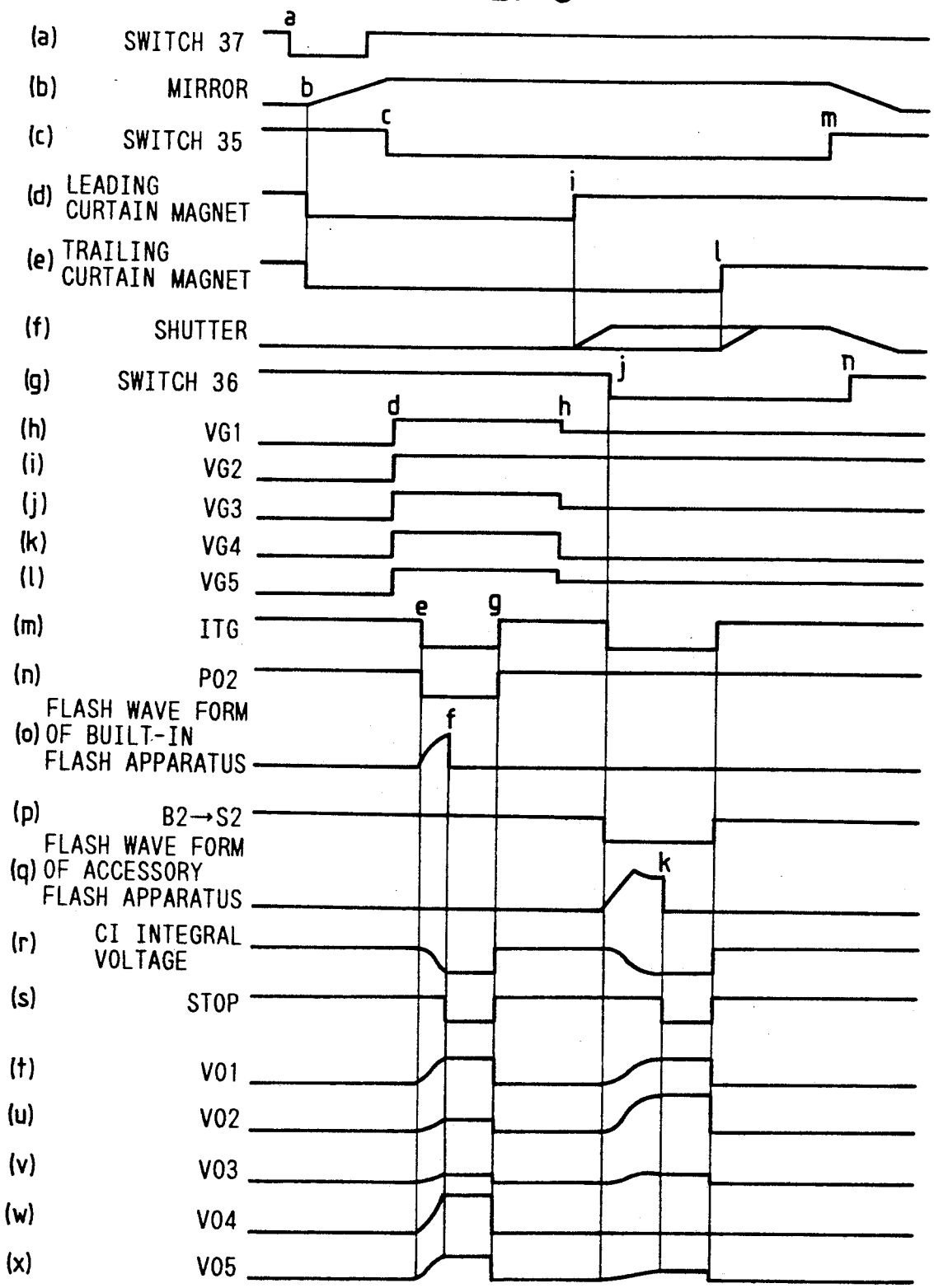
FIG. 6 is a timing chart of the release operation.
Figure 7:
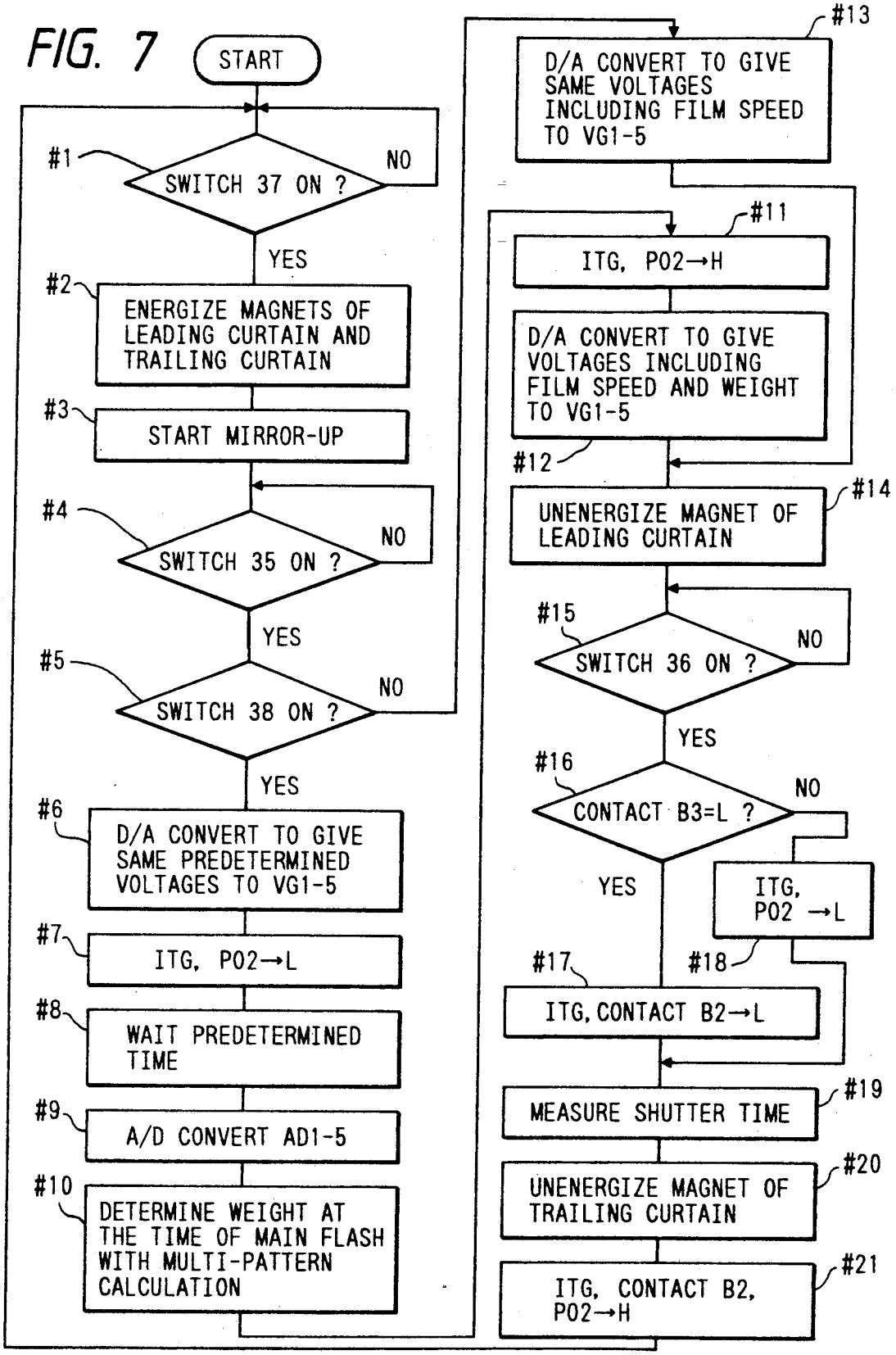
FIG. 7 is a flow chart showing the operation of a microcomputer in the camera body.

Next, in the flow chart of FIG. 7, at #8, waiting is effected for a predetermined time with the maximum value of the time until the termination of the preliminary flashing control operation taken into account, in order to secure the time for which the light measurement and light adjustment circuit 11 performs the above-described operation. At #9, the integrated voltages of the output terminals VO1-VO5, by preliminary flashing, corresponding to the divided areas of the object field are A/D-converted by an A/D converter contained in the microcomputer, and at #10, the result of the A/D conversion is passed through a predetermined multi-pattern calculation algorithm and the degree of weighting to the divided areas during main flashing for photographing is determined. What is disclosed, for example, in the aforementioned U.S. application Ser. No. 560,745 would be supposed as the substance of this multi-pattern calculation algorithm, but it is not directly related to the gist of the present invention and therefore need not be described herein. When the multi-pattern calculation is terminated, at #11, ITG and port P02 are both restored to H (a point g shown in FIGS. 6(m) and (n)), and the integration capacitors C1 and C11-C51 in the light measurement and light adjustment circuit 11 are caused to discharge and preparations are made for the next main flashing operation. At #12, the D/A conversion of five channels is executed to give gain setting voltages for the respective channels to the terminals VG1-VG5 after reflecting the degree of weighting to the divided areas determined at #10, and taking into account the adjustment of the gain to the film speed (a point h shown in FIGS. 6(h)-(l)). Thereby, setting is effected such that an electric current of enhanced amplification factor is integrated with regard to a divided area higher in weighting.

On the other hand, if at #5, the control method of the TTL flash control of the camera body 1 is selected to the TTL ordinary flash control directing mode, the preliminary flashing operation by #6-#12 is not effected but skip is made to #13, where the D/A conversion of the five channels is executed to give the terminals VG1-VG5 a predetermined gain setting voltage including only the film speed so that uniform weighting may be provided with regard to the respective divided areas. Speaking in the timing chart shown in FIG. 6, the variation in the signal waveform up to immediately before a point d to a point h shown in FIGS. 6(h)-(l) becomes null, and the operation of the point h is performed at the point of time of the point d. Accordingly, the falling pulse from the point e to the point g of ITG and port P02 shown in FIGS. 6(m) and (n) is not put out in this case and the preliminary flashing by the built-in flash apparatus 50 is not effected. Thus, TTL ordinary flash control is effected in such a form that uniform light measurement (average light measurement) is done with respect to the entire area of the surface of the film.

In the preparations hitherto, at #14, the magnet 31 of the leading curtain is electrically deenergized to start the actual shutter release operation (a point i shown in FIG. 6(d)). Thus, the leading curtain 87 starts its movement. At #15, the closing of the switch 36 after the shutter is fully opened is waited for, and when this switch is clsoed (a point j shown in FIG. 6(g)), the level of a contact B3 is immediately discriminated at #16 and if the level is L, that is, if the accessory flash apparatus 101 is detected as "being mounted", at #17, ITG and a contact B2 are both rendered into L and the starting of main flashing is commanded to the accessory flash apparatus 101 and the starting of the integration in the light measurement and light adjustment circuit 11 is permitted. If at #16, the contact B3 is at H, that is, if the accessory flash apparatus 101 is detected as "being not mounted", at #18, ITG and port P02 are both rendered into L and the starting of main flashing is commanded to the built-in flash apparatus 50, and also the starting of the integration in the light measurement and light adjustment circuit 11 is permitted. The timing chart of FIG. 6 is shown with respect to a case where the accessory flash apparatus 101 is mounted, and the accessory flash apparatus 101 effects flashing as indicated by the flashing waveform of FIG. 6(q). Thereby, in the light measurement and light adjustment circuit 11, the integration capacitor C1 is charged with the sum total of the expanded currents of the transistors Q11–Q51 now including weighting. When this exceeds the predetermined reference voltage E2, the STOP terminal changes from H to L, and this signal is given to the accessory flash apparatus 101 via contacts B1 to S1. Thus, the accessory flash apparatus 101 stops flashing (a point k shown in FIG. 6(q)). At this point of time, exposure for photographing effected with the accessory flash apparatus 101 as a light source is terminated. The program of the microcomputer 12 measures the time after the magnet 31 of the leading curtain is deenergized at #14, and deenergizes the magnet 32 of the trailing curtain at #20 at a point of time whereat the set shutter time has elapsed (a point l shown in FIG. 6(e)). Also, on the spot, at #21, all the terminals of ITG, the contact B2 and the port P02 are restored to H, and preparations are made for the release operation for the next frame. Thereafter, when a shutter charge driver and a mirror down driver, not shown, are driven, the switch concerned in each sequence restores its original OFF state at points m and n shown in FIG. 6(c). Thus, the operation during the shutter release is terminated.

Figure 8:
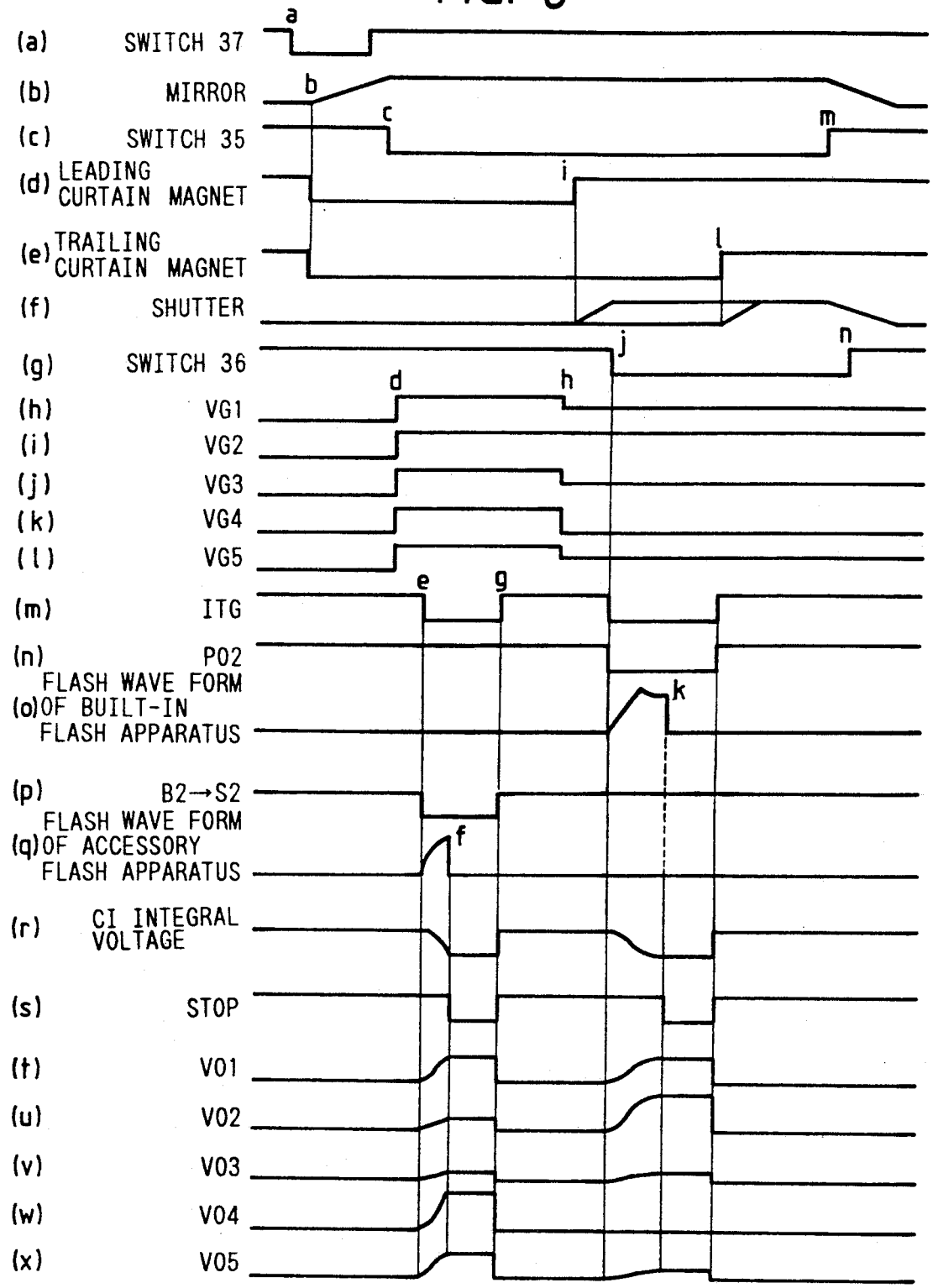
FIG. 8 is a timing chart of another embodiment.
Figure 9:
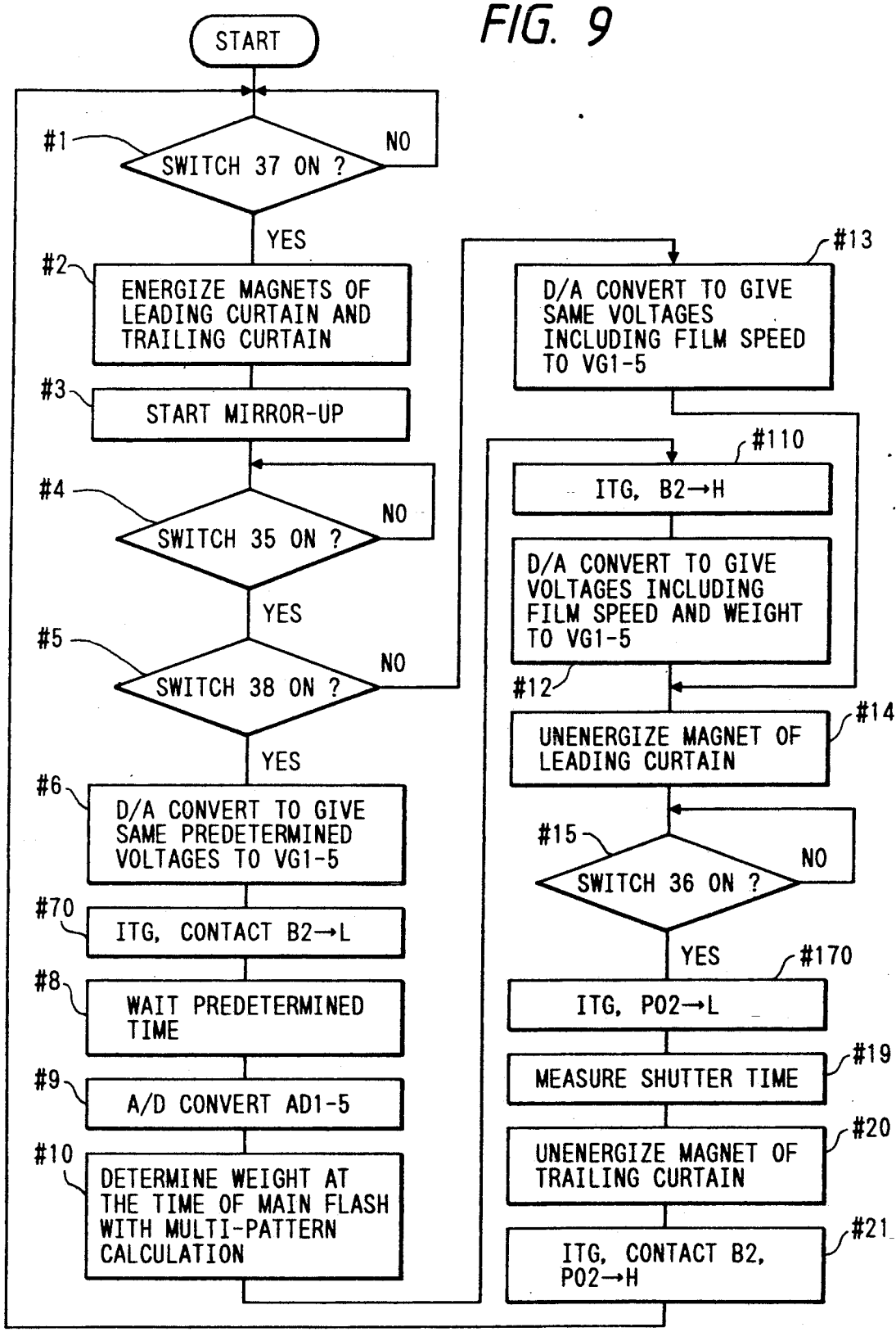
FIG. 9 is a flow chart of another embodiment.

Another embodiment will now be described with reference to FIGS. 8 and 9. In this embodiment, preliminary flashing is effected by the accessory flash apparatus mounted on the camera body, and subsequently main flashing is effected by the built-in flash apparatus contained in the camera body, whereby flash photographing under TTL multi-flash control is accomplished.

This embodiment is identical in most constructions to the previously described embodiment, but differs in the exchange of some signals from the latter embodiment. Accordingly, the constructions of portions differing from those of the previously described embodiment will hereinafter be described.

The operation of this TTL automatic flash control camera system will now be described with reference to the timing chart of FIG. 8 and the flow chart of FIG. 9.

When the power source switch is first closed, the microcomputer 12 of the camera body 1 starts to execute the program. It executes #1–#6 of FIG. 9 (as in FIG. 6). Thereafter, advance is made to #70, where for the light measurement and light adjustment circuit 11, ITG is rendered into L as an integration starting signal and for the flashing control circuit 112 of the accessory flash apparatus 101, the contact B2 is rendered into L (a point e shown in FIGS. 8(m) and (p)). Thus, the accessory flash apparatus 101 starts preliminary flashing, and flashes as indicated by the flash waveform from a point e to a point f shown in FIG. 8(q). Thereafter, the light measurement and light adjustment circuit 11 performs an operation similar to that in the previously described embodiment.

At #15, the closing of the switch 36 is waited for after the shutter is fully opened, and when this switch is closed (a point j shown in FIG. 8(g)), at #170, ITG and the contact P02 are both immediately rendered into L and the starting of main flashing is commanded to the built-in flash apparatus 50. Then, the starting of the integration in the light measurement and light adjustment circuit 11 is permitted. Thereafter, an operation similar to that in the previously described embodiment is performed.

As described above, in the first embodiment of the present invention, if an accessory flash apparatus of the conventional type capable of effecting TTL ordinary flash control is mounted on the camera body, main flashing is effected by the accessory flash apparatus in subsequence to the preliminary flashing by a built-in flash apparatus and flash photographing under TTL multi-flash control becomes possible. That is, simply by a built-in flash apparatus being provided in a camera body endowed with the TTL multi-flash control function, any of many flash apparatuses capable of effecting TTL ordinary flash control which are commercially available can become a member of a TTL multi-flash control camera system. Also, by making the built-in flash apparatus have charge of preliminary flashing, the fear of reducing the guide number during main flashing is eliminated.

Also, in the second embodiment of the present invention, if an accessory flash apparatus is not mounted on the camera body, that is, even if an accessory flash apparatus is not mounted depending on scene, preliminary flashing and main flashing may be effected on end by only a built-in flash apparatus, whereby flash photographing under TTL multi-flash control becomes possible. That is, as long as an object at a relatively short distance is to be photographed, preliminary flashing and main flashing may be effected on end by only the built-in flash apparatus without an accessory flash apparatus being mounted, whereby TTL multi-flash control photographing becomes possible and the range of flash photographing becomes wider and wider.

What is claimed is:

1. A TTL automatic flash control camera including:
   first flashing means contained in the body of the camera and capable of effecting preliminary flashing prior to main flashing;
   photoelectric converting means for detecting the reflected light distribution information of the area of the object field divided into a plurality of areas by said preliminary flashing of said first flashing means;
   determining means for determining the degree of weighting to said divided areas by said reflected light distribution information;
   connecting means capable of mounting flash-controllable second flashing means; and
   flash control means capable of TTL multi-flash control for causing said first flashing means to effect said preliminary flashing, and causing said second flashing means being mounted to effect said main flashing after said photoelectric converting means detects said reflected light distribution information based on said preliminary flashing, and effecting the control of the quantity of emitted light during said main flashing by the use of the degree of weighting determined by said determining means.

2. A TTL automatic flash control camera including:
   flash-controllable first flashing means contained in the body of the camera and capable of effecting preliminary flashing prior to main flashing;
   photoelectric converting means for detecting the reflected light distribution information of the area of the object field divided into a plurality of areas by said preliminary flashing of said first flashing means;
   determining means for determining the degree of weighting to said divided areas by said reflected light distribution information;
   connecting means capable of mounting flash-controllable second flashing means;

mounting detection means for detecting the presence or absence of said second flashing means mounted and producing a signal; and flash control means capable of TTL multi-flash control for causing said first flashing means to effect said preliminary flashing, and causing said second flashing means being mounted to effect said main flashing when said flash control means receives a signal indicative of the presence of said second flashing means from said mounting detection means after said photoelectric converting means detects said reflected light distribution information based on said preliminary flashing, and causing said first flashing means to effect said main flashing when said flash control means receives a signal indicative of the absence of said second flashing means from said mounting detection means, and effecting the control of the quantity of emitted light during said main flashing by the use of the degree of weighting determined by said determining means.

3. A TTL automatic flash control camera according to claim 2, wherein said flash control means causes said first flashing means to effect said preliminary flashing and said main flashing by the same flashing portion when it receives the signal indicative of the absence of said second flashing means from said mounting detection means.

4. A TTL automatic flash control camera including:

first flashing means contained in the body of the camera;

connecting means capable of mounting flash-controllable second flashing means;

photoelectric converting means for detecting the reflected light distribution information of the area of the object field divided into a plurality of areas by the preliminary flashing of said second flashing means prior to main flashing;

determining means for determining the degree of weighting to said divided areas by said reflected light distribution information; and flash control means capable of TTL multi-flash control for causing said second flashing means to effect said preliminary flashing, and causing said first flashing means to effect said main flashing after said photoelectric converting means detects said reflected light distribution infromation based on said preliminary flashing, and effecting the control of the quantity of emitted light during said main flashing by the use of the degree of weighting determined by said determining means.

* * * * *